Patented Aug. 12, 1941

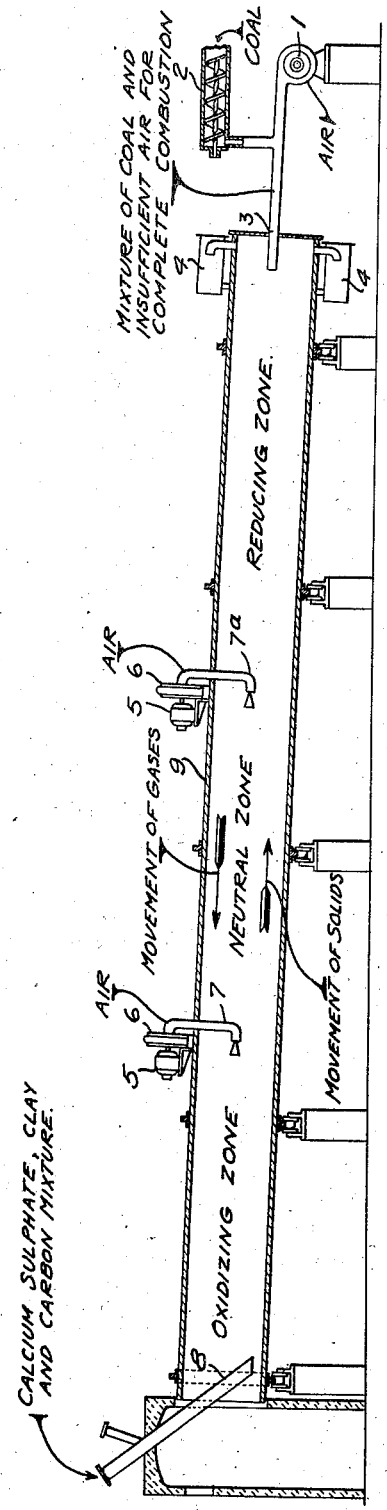

2,252,279

UNITED STATES PATENT OFFICE 2,252,279

MANUFACTURE OF SULPHUR DIOXIDE AND PORTLAND CEMENT FROM CALCIUM SULPHATE AND THE USUAL ADDITIONS CONTAINING ALUMINUM SILICATE

Hans Zirngibl and Heinrich Zur Strassen, Wolfen, Kreis Bitterfeld, Germany, assignors, by mesne assignments, to Walther H. Duisberg, New York, N. Y.

Application June 14, 1939, Serial No. 279,042
In Germany July 6, 1938

2 Claims. (Cl. 23—177)

The invention relates to the manufacture of sulphur dioxide and Portland-cement from calcium sulphate and the usual additions containing aluminum silicate. Specific details may be seen from the specification following hereafter.

A number of processes have already been suggested for the decomposition of mixtures of clay and gypsum in order to obtain sulphuric acid and cement or clinkers capable of being leached on aluminum oxide. For instance the merely thermal decomposition of the mixtures was attempted, but this decomposition has the drawback that very high temperatures must be applied for decomposing the calcium sulphate; on the one hand a large amount of fuel is necessary thereby and on the other hand the clinker sinters and melts too much, for the temperatures to be applied are higher than those applied in the usual calcination process of cement. Other processes relate to the reduction of the mixtures by means of carbon. It has been suggested, for instance, to reduce the mixture with an excess of carbon ($SO_4 : C = 1 : 1.2$) in the presence of steam blown in. However, other sulphur compounds are formed thereby besides sulphur dioxide. The same applies to another process according to which an excess of reducing agent is used and the mixture is then oxidized by heating in a further zone. In this case sulphur vapour is chiefly formed besides sulphur dioxide so that this process is likewise unsuitable for obtaining sulphuric acid. Finally it has been suggested to maintain the proportion of $SO_4:C$ greater than 1 and to oxidize the whole in a gaseous atmosphere. The quantity of carbon applied is below the upper limit and by the oxidizing gaseous atmosphere part of the carbon is further removed by oxidation. The formation of sulphur dioxide alone and the absence of calcium sulphide in the final product are guaranteed thereby, but according to this mode of working more or less undecomposed calcium sulphate always remains which can only be decomposed by the application of especially high temperatures. Therefore, only such mixtures can be used as sinter at a high temperature.

According to the present invention these drawbacks have been overcome, coal for heating is saved, a gas with a high content of sulphur dioxide is obtained and a high strain of the furnace is avoided. Furthermore, the process does not depend on the sintering temperature so that mixtures sintering at a low temperature may likewise be applied.

In the present case the reduction of calcium sulphate with the usual additions containing aluminum silicate is carried out in two stages without sintering in an internally heated furnace by performing the main reduction with a quantity of reducing agent smaller than the amount theoretically required and by performing the final reduction solely with gaseous reducing agents. As aluminum silicates there may be used: clay, clay slate, coal ash and the like; as further additions there may be used substances rich in silicic acid or alumina such as sand or bauxite, that is to say the mixture is composed in known manner according to the desired properties of the clinker. The product is sintered only after the reduction is complete. In the case of cements containing much iron it is advisable to work in an oxidizing atmosphere.

The furnace is subdivided into several zones, the first of which serves to pre-heat the material to about 700° C., an oxidizing gas being introduced. In the second zone, the main zone of reduction, the reducing agent used in a quantity smaller than the amount theoretically required—suitably carbon—is caused to react in the known manner, partly to form calcium sulphide which, however, reacts with calcium sulphate to form calcium oxide and sulphur dioxide. The temperature in said zone is raised to 1000° C. or to 1100° C. The gaseous atmosphere is kept inert if carbon is used. The reduction of the calcium sulphate still present in excess is completed in a further zone of the furnace by means of a gaseous reducing agent which is either blown into said zone or—and this being the simpler way—is produced, for instance in the case of a coal dust firing, by a quantity of air smaller than the amount theoretically required; the temperatures applied for the reduction are somewhat below the sintering temperature of the mixture. The material then passes the sintering zone and leaves the furnace free from sulphur.

A suitable apparatus is illustrated diagrammatically in the accompanying drawing.

In the drawing the furnace is shown as a common rotary furnace comprising a rotatable cylinder 9 suitably supported on bearings. A blower 1, a coal dust feed 2 and air chambers 4 are arranged at the lower end of the furnace. Means 8 for introducing the charge of calcium sulphate, clay and carbon are arranged at the high end of the furnace. Air supply means comprising motors 5, blowers 6 and feed pipes 7 and 7a are arranged on the cylinder at two points intermediate of its ends. As indicated in the drawing three zones are provided in the furnace, namely an oxidizing zone adjacent the charge inlet end, a neutral zone at the middle part and a reducing zone at the lower or solid discharge end of the cylinder. The reducing zone is formed by blowing coal dust and insufficient air for complete combustion. In order to create the second neutral main reducing zone, so much air is blown in that all excess gaseous reducing agents are burned. At 7, air is again blown in whereby the oxidizing pre-heating zone is created.

The characteristic feature of the present invention resides in the application of a gas-reducing zone in order to decompose the rest of calcium sulphate at much lower temperatures than those required for the thermal decomposition. During this operation the calcium sulphate directly decomposes according to the following equation:

$$CaSO_4 + H_2(CO) = CaO + SO_2 + H_2O(CO_2)$$

A formation of sulphide does no longer occur. It is necessary to operate in a slightly reducing atmosphere (2–3 per cent. of reducing gas) so as to avoid a further reduction of sulphur dioxide. Should however, a small amount of sulphur vapour be formed, it is transformed into sulphur dioxide by the oxidizing preheating zone.

A particular advantage of the present process resides in the fact that it is not necessary, as in other processes, exactly to determine the quantity of carbon. Moreover, uncontrollable quantities of carbon cannot be burnt at raised temperatures by the oxidizing atmosphere applied in the known processes and thus cause a permanent adjustment of the working of the furnace, which adjustment may cause the formation of solid sintered masses deposited in annular form at the wall of the furnace, or escape of sulphur and others. In order to produce as far as possible only sulphur dioxide the ratio of $SO_4 : C$ must be greater than 1, preferably 1 : 0.5–0.6. The process is applicable to all mixtures of clay with calcium sulphate which are of industrial importance as it does not depend in any way on the quantitative proportions of clay : $CaSO_4$. Mixtures of Portland cement which have low sintering temperatures, such as the known Ferrari cements rich in iron may thus readily be made. Furthermore it is possible to obtain mixtures capable of being leached on alumina; these mixtures are first adjusted rich in aluminum oxide and poor in calcium oxide and only after the leaching of the alumina they are transformed into Portland cement by calcining them again, if necessary after further additions have been admixed. Starting mixtures of this kind which contain 2 mol each of CaO for 1 mol of $SiO_2$, 1 mol of $Al_2O_3$ and 1 mol of $Fe_2O_3$ have a particularly low sintering point.

The following examples illustrate the invention:

1. 55 parts of a dried clay consisting of

| | Per cent |
|---|---|
| $SiO_2$ | 53.5 |
| $Al_2O_3 + TiO_2$ | 33 |
| $F_2O_3$ | 2.8 |
| CaO | 0.7 |
| $H_2O$ | 9.8 | are mixed with 240 parts of $CaSO_4$ (anhydrite of 98 per cent. strength) and 14 parts of coke made from mineral coal (85 per cent. of C), the mixture is ground in a tube mill until the degree of fineness of cement is attained and the ground material is then charged into a revolving tubular kiln heated by means of coal dust firing; gas and air may be blown into said kiln at different parts.

The material first passes a pre-heating zone containing about 1 per cent of $O_2$; it is heated therein to about 700° C–800° C. The main reduction and the decomposition to about 1100° C. are then performed in a carbon reduction zone which is kept in an inert condition. The final reduction is effected at a temperature up to about 1300° C. in a weakly reducing zone and the material is caused to sinter at 1450° C. The various zones are arranged by regulating the supply of air. The bottom zone is produced by a quantity of air in a proportion smaller than the coal dust blown in. At the bottom part of the central zone such a quantity of air is let in as causes the gaseous atmosphere to be neutral. At the bottom part of the zone of pre-heating there is added the quantity of air required for the desired excess. The clinkers leaving the kiln correspond to a good cement clinker and are substantially free from sulphur (less than 0.2 per cent of sulphur). They are ground as usual and then further treated. The $SO_2$-gases leaving the furnace contain about 10 per cent of $SO_2$ besides 1 per cent of $O_2$; they are mixed with 40 to 50 per cent of air and the mixture is worked up in known manner to obtain sulphuric acid.

Instead of carbon monoxide produced from coal dust there may be used hydrogen, water gas, generator gas or the like for carrying out the final reduction.

2. 50 parts of a slag of lignite consisting of

| | Per cent |
|---|---|
| $SiO_2$ | 26 |
| $Al_2O_3 + TiO_2$ | 12.5 |
| $Fe_2O_3$ | 14.5 |
| CaO | 23 |
| C | 8.5 |
| S | 3.0 | are mixed with 11 parts of Si-substance (residues from the acid decomposition of clay having a content of 90 per cent of $SiO_2$, 8 per cent of $Al_2O_3$, $TiO_2$ and 1 per cent of $Fe_2O_3$) 160 parts of anhydrite and 5 parts of coke and the mixture is worked up in the manner described above. The sintering temperature of this clinker which constitutes a so-called "Ferrari-cement" is at 1350° C.; care has, therefore, to be taken that the reduction is terminated at a temperature below 1300° C.

3. The same components as named in Example 1 are mixed in the following proportions: 55 parts of clay, 180 parts of anhydrite, 10.5 parts of coke. The material is ground and charged into a revolving kiln. Subdivision of the zones, composition of the gas and the temperatures are the same as in Example 1, merely in the third gas reduction zone the final temperature is kept just below 1300° C., because a mixture sintering at a low temperature is treated. The material leaving the kiln and sintered at 1300° C. disintegrates on cooling and is substantially free from sulphur (0.1–0.2 per cent of sulphur). From this clinker 80 per cent. of the alumina is extracted by means of sodium carbonate solution. In this case a complete desulphurisation is particularly important as pari passu with the increasing quantities of sulphur an increasing loss of $Na_2CO_3$ or NaOH occurs during the extraction process. From the residues from extraction to which are added 19 parts of calcium carbonate and 2 parts of iron oxide there is obtained, after calcining has been repeated, a highly valuable Portland cement.

4. The same parent components as used in

Example 1 are mixed in the following proportion:

55 parts of clay, 230 parts of anhydrite, 14 parts of coke, 18 parts of bauxite containing about 55 per cent. of $Al_2O_3$, 18 per cent of $Fe_2O_3$, 4 per cent of $SiO_2$, 4 per cent of $TiO_2$. The mixture is worked up as described in Example 1. There is obtained a disintegrating clinker, from which the alumina can be extracted up to 85 per cent. The residue may be further treated without any addition by calcining it again at 1300° C. A highly valuable Portland cement is obtained containing 68 per cent of CaO, 22 per cent of $SiO_2$, 4 per cent of $Al_2O_3$, 3.5 per cent of $Fe_2O_3$, 1.8 per cent of $TiO_2$.

The invention is of course not limited to the specific details described, for obvious modifications may occur to a person skilled in the art. Thus, for instance, the reduction may be carried out only with gaseous reducing agents.

What we claim is:

1. The manufacture of sulphur dioxide and Portland cement from a mixture of calcium sulphate and the usual additions containing aluminum silicate which comprises reducing the mixture in an internally heated furnace in two stages before the sintering operation, the main reaction in the middle zone of the furnace which immediately follows the preheating zone being performed with a quantity of coal smaller than the amount theoretically required for the formation of $SO_2$ and the final reduction in the end zone of the furnace being solely performed with a gaseous reducing agent.

2. The manufacture of sulphur dioxide and Portland cement from a mixture of calcium sulphate and the usual additions containing aluminum silicate which comprises preheating the mixture in a first zone to about 700–800° C. and reducing the main quantity in a second zone at a temperature rising to about 1000–1100° C. and the rest in a third zone heated just below the sintering temperature, in the first zone slightly oxidizing conditions being applied, in the second zone carbon being applied in an inert atmosphere and in the third zone a gaseous reducing agent being applied.

HANS ZIRNGIBL.
HEINRICH ZUR STRASSEN.